2,901,469
COATING COMPOSITIONS

John C. Cowan and Howard M. Teeter, Peoria, Ill., assignors to the United States of America as represented by the Secretary of Agriculture No Drawing. Application October 15, 1956
Serial No. 616,110

1 Claim. (Cl. 260—91.1)

(Granted under Title 35, U.S. Code (1952), sec. 266)

A non-exclusive, irrevocable royalty-free license in the invention herein described, throughout the world for all purposes of the United States Government, with the power to grant sublicenses for such purposes, is hereby granted to the Government of the United States of America.

This invention relates to protective coating compositions comprising a vehicle, film-forming ingredient and a dryer, in particular to the use of homopolymers of vinyl ethers of long-chain polyunsaturated fatty alcohols as the film-forming ingredient.

The vinyl ethers of this invention are the vinyl ether of linoleyl alcohol, the vinyl ether of linolenyl alcohol, otherwise defined as (linoleyl) $OCH=CH_2$, (linolenyl) $OCH=CH_2$, or they are the mixed vinyl ethers of the mixed polyunsaturated fatty alcohols obtained by reduction of soybean oil, linseed oil, safflower oil and other drying and semidrying vegetable oils.

The invention is based on the discovery that polymerization of the vinyl ethers described above links predominantly the vinyl groups therein, so that the unsaturation originally present in the fatty alcohol from which the vinyl ether is derived, is substantially present in the homopolymer. Protective coating films can be obtained from these vinyl homopolymers by air-drying or baking of a film formed from the composition.

The unsaturated fatty alcohols can be prepared by any of several well-known methods of reduction of unsaturated fatty esters. For example, reduction of methyl linoleate with sodium yields linoleyl alcohol. Similar reduction of soybean oil yields a mixture of unsaturated fatty alcohols having substantially the same unsaturation as the mixture of fatty acids present as glycerol esters in the original oil. Alcohols derived in this way from soybean and linseed oil are articles of commerce.

Vinyl ethers of these polyunsaturated alcohols can be obtained by reaction of the alcohol with acetylene in the presence of an alkaline catalyst, for example, by the method disclosed by Reppe, U.S. Patent No. 1,959,927. Because of the isomerizing action of the alkaline catalyst, the products contain variable amounts of conjugation depending in part upon the temperature of vinylation. This conjugation is predominantly of the diene type. Comparatively small amounts of triene and tetraene conjugation are observed.

Polymerization of the vinyl ethers may be effected by catalysts of the type referred to as "Lewis Acids," i.e., boron trifluoride, ferric chloride, stannic chloride, aluminum chloride, and the like. Temperature of polymerization may be in the range of $-50°$ C. to $+100°$ C. Polymerization is preferably carried out in the presence of 1 to 3 ml. of a suitable solvent, such as methylene chloride or benzene, per gram of vinyl ether. Catalyst concentration is in the range of 0.1 to 1 percent based on weight of vinyl ether.

Many combinations of these reaction variables will yield satisfactory polymers. For example, the concentration of catalyst that might be employed will be larger in the event that the vinyl ether is less pure and will be smaller as the purity of the vinyl ether increases. The amount of solvent employed will be dependent upon the temperature; thus, a larger volume of solvent will be required if polymerization is carried out at a low temperature, in order to prevent crystallization of the vinyl ether from the solvent. Some of the preferred combinations of reaction variables will be evident from the subsequent examples.

Homopolymers of unsaturated vinyl ethers prepared as described above may be dissolved in a suitable vehicle such as toluene or xylene to which has been added from 0.001 to 0.1 percent of a metallic drier and then spread into a thin film upon glass or other suitable surface. These films will be found to dry upon standing at room temperature or alternatively, they may be baked in an oven at temperatures between 100 and 200° C.

Films prepared by drying at room temperature are colorless and are comparatively soft. Those prepared by baking are hard and glossy, becoming harder as baking time is prolonged. Properly prepared films are very resistant to the action of alkali; for example, they are not dissolved by prolonged exposure to 5 percent aqueous sodium hydroxide solution. Films of these vinyl ether polymers are also unaffected by a variety of solvents including ethanol.

Polymers of vinyl ethers of polyunsaturated alcohols can be emulsified with water as the vehicle using suitable ammonium soaps as emulsifiers. Films equivalent to those obtained from solutions of the polymers can be obtained from these emulsions.

The following specific examples illustrate the invention:

Example 1

Soybean fatty alcohols are vinylated by heating at 180° C. in a current of acetylene for 1½ to 2 hours in the presence of 5 percent potassium hydroxide as catalyst. The resulting vinyl ether, after purification by distillation, contains approximately 42.6 percent diene conjugation and less than 0.5 percent each of triene and tetraene conjugation. It is utilized for polymerization according to the following procedure: The vinyl ether (15 grams), dissolved in at least 10 to 15 milliliters of absolute benzene, is added dropwise to 150 mg. of catalyst in 10 ml. of absolute benzene. Suitable catalysts are aluminum chloride, stannous chloride, or zinc chloride. The reaction mixture is heated at reflux for four hours in the reactions involving aluminum chloride, whereas those involving stannous chloride and zinc chloride are refluxed for 48 hours. Steam distillation of the benzene solution, followed by decantation, yields the homopolymer as a residue. The homopolymer is purified by trituration with hot methanol to remove monomer and any long-chain fatty alcohols that might be present. Excess methanol is eliminated from the homopolymer by evaporation in vacuo. The resulting polymer of the vinyl ether of soybean alcohols is recovered as a golden yellow to brownish viscous oil having a molecular weight of approximately 1,500 and an iodine value of 99.5.

Example 2

One drop of 15 percent boron trifluoride etherate is added to 15 g. of vinyl ethers of soybean alcohols dissolved in 15 ml. of absolute benzene. Polymerization proceeds spontaneously. The temperature is not allowed to rise above 30° C. Water is added to quench the reaction at the end of 1 hour. The reaction mixture is then treated for isolation of the homopolymer as described in Example 1. The product is a water-white viscous oil having a molecular weight of approximately 1,100 and an iodine value of approximately 94.

Example 3

Polymers of vinyl ethers of soybean alcohols are prepared as described in Example 2 except that the solvent benzene is omitted. The homopolymer, in this case, is a water-white viscous oil having a molecular weight between 2,500 and 3,000 and an iodine number of 80.

Example 4

Linseed vinyl ethers are prepared from linseed fatty alcohols by the procedure described in Example 1, and the resulting vinyl ethers, which contain about 30.3 percent of diene conjugation and less than 0.1 percent each of triene and tetraene conjugation, are polymerized as described in Example 1 using stannous chloride as a catalyst. The product is a reddish brown viscous oil having a molecular weight of approximately 1,600 and an iodine number of 123. The time of polymerization in this example was 48 hours in refluxing benzene.

Example 5

This example illustrates polymerization at low temperatures. A solution of 1 gram of vinyl ethers of soybean fatty alcohols in 3 ml. of methylene chloride is cooled to −40° C. A 15 percent boron trifluoride etherate solution is added drop by drop until reaction begins. Polymerization proceeds spontaneously and is over within a few minutes. The product is isolated as described in Example 1. The product is a very viscous, colorless oil having a molecular weight in the range of 2,000 to 3,000.

Example 6

Methyl linoleate is reduced with metallic sodium to linoleyl alcohol which is vinylated as described in Example 1 to produce linoleyl vinyl ether. This vinyl ether is polymerized with boron trifluoride etherate, as described in the preceding example, to yield a homopolymer having similar physical and chemical properties to that obtained in the preceding example.

Example 7

Safflower oil is reduced with metallic sodium to safflower fatty alcohols which are vinylated as described in Example 1 to produce vinyl ethers of safflower fatty alcohols. The product is a colorless liquid, boiling at 114–118° C. at 0.015 mm. It contains about 60 percent of diene conjugation and less than 0.1 percent each of triene and tetraene conjugation.

Example 8

Vinyl ethers of safflower fatty alcohols (3 g.), prepared as described in Example 7, are dissolved in 10 ml. of methylene chloride and cooled to −35° C. Five drops of a 15 percent solution of boron trifluoride in ether are added. Polymerization proceeds exothermically causing the temperature of the reaction mixture to rise to −10° C. The product is isolated by the procedure described in Example 1. It is a colorless, viscous oil.

Example 9

One gram of the homopolymer of soybean vinyl ethers as prepared in Example 5 is dissolved in 3 ml. of toluene and 0.01 percent of cobalt as cobalt naphthenate is added. The mixture is cast into a thin film upon glass using a doctor blade. The coated glass is baked in an oven at 145° C. for 1 hour, yielding a very hard, glossy, light yellow film which resists attack by 5 percent aqueous sodium hydroxide for 10 minutes. The film is unaffected by immersion in 95 percent ethanol for several days.

Example 10

One gram of the homopolymer of soybean vinyl ethers as prepared in Example 5 is dissolved in 3 ml. of toluene and 0.1 percent of cobalt as cobalt naphthenate is added. The mixture is cast into a thin film upon glass and allowed to dry over night at room temperature. A moderately soft, colorless film is obtained that swells but does not dissolve upon immersion in 5 percent aqueous sodium hydroxide solution for 1.5 hours.

Example 11

One gram of the homopolymer of soybean vinyl ethers as prepared in Example 5 is dissolved in 3 ml. of toluene and 0.4 percent of lead as lead naphthenate is added. A thin film, cast upon glass and baked for 1 hour at 150° C., swells somewhat on immersion in 5 percent sodium hydroxide solution but is not dissolved after immersion for 2 hours.

Example 12

Films are cast on glass from a solution of 1 g. of the homopolymer used in Example 9, dissolved in 2 g. of toluene containing 1 drop of a 6 percent solution of cobalt naphthenate drier. These films dry at room temperature in 1.5 hours. Hard glassy films are obtained by baking for 4 hours at 110° C. or for 1 hour at 145° C.

Example 13

This example describes preparation of an emulsion from polymerized vinyl ethers of soybean alcohols. A mixture of 10 g. of polymerized vinyl ethers of soybean alcohols, 0.5 g. of ammonium oleate or the ammonium soap of conjugated soybean fatty acids, and 0.13 g. of a solution of cobalt naphthenate containing 6 percent cobalt is stirred under nitrogen at approximately 4,000 r.p.m. Ten grams of water is then added slowly with constant stirring. Stirring is continued for 15 minutes. The product is a smooth, creamy emulsion that is stable for at least a week.

Films were cast from the emulsion and dried either in air or by baking. These films appeared to be continuous and to have properties equivalent to films prepared from solutions of the polymer.

Having thus described our invention what we claim is:

A protective coating composition comprising a vehicle, a dryer and a film-forming ingredient, said film-forming ingredient consisting essentially of homopolymers of vinyl ethers of polyunsaturated fatty alcohols, said film-forming ingredient being selected from the group consisting of homopolymers of the vinyl ether of linoleyl alcohol, the vinyl ether of linolenyl alcohol, and homopolymers of the vinyl ethers of the mixed polyunsaturated fatty alcohols obtained by reduction of drying and semidrying vegetable oils, said homopolymers being polymerized predominately by linking of the vinyl groups, the unsaturation originally present in the fatty alcohol being substantially present in the homopolymer.

References Cited in the file of this patent

UNITED STATES PATENTS

| | | |
|---|---|---|
| 2,020,703 | Schumann et al. | Nov. 12, 1935 |
| 2,353,910 | Lawler et al. | July 18, 1944 |
| 2,603,628 | Fluchaire et al. | July 15, 1952 |
| 2,654,717 | Rehberg et al. | Oct. 6, 1953 |
| 2,800,516 | Wilson | July 23, 1957 |
| 2,803,671 | Wilson | Aug. 20, 1957 |

OTHER REFERENCES

Bailey: "Industrial Oil and Fat Products," 2nd edition (New York: Interscience Publishers, Inc., 1951), pages 120–124 and 187. (Copy in Patent Office Science Library.)